Patented Sept. 24, 1940

2,216,045

UNITED STATES PATENT OFFICE 2,216,045

WATER SOLUBLE ETHERS OF ALPHA CELLULOSE

Donald H. Powers, Moorestown, N. J., and Louis H. Bock and Alva L. Houk, Philadelphia, Pa., assignors to Röhm & Haas Company, Philadelphia, Pa.

No Drawing. Application May 27, 1937,
Serial No. 145,042

3 Claims. (Cl. 260—231)

This invention relates to water-soluble methyl and ethyl ethers of α-cellulose having a low degree of alkylation.

In application Serial No. 750,128 filed October 26, 1934, now Patent No. 2,087,549 granted July 20, 1937, of which this application is a continuation-in-part, there is disclosed and claimed a new process of making ethers of α-cellulose which essentially consists in dissolving α-cellulose in an aqueous solution of a quaternary ammonium hydroxide and treating the solution with an etherifying agent. By that process methyl and ethyl ethers of α-cellulose are obtained that are substantially different from those obtained by prior art methods.

In the previous methods of making α-cellulose ethers, it was necessary to introduce from 1.25 to 1.67 methoxy groups for each $C_6H_{10}O_5$ unit in order to impart water-solubility to the methyl cellulose. It was not possible to obtain a water-soluble ethyl ether from undegraded cellulose. The water-soluble methyl ethers that contained fewer methoxy groups and all the water-soluble ethyl ethers were obtained by first degrading the cellulose until it became soluble in alkali.

By the process of the above mentioned parent application water-soluble methyl and ethyl ethers of α-cellulose can be obtained that contain from 0.6 to 1.0 methyl or ethyl groups for each $C_6H_{10}O_5$ unit without degradation of the cellulose. Ethers of higher alkylation, those that contain more than 1.2 alkyl groups per $C_6H_{10}O_5$ unit are not water-soluble. These differences from the prior art, it is believed, are due to a more uniform distribution of the ether groups throughout the cellulose molecule brought about by the cellulose being in solution during the etherification. In the prior art processes the cellulose is not in solution during reaction so that its exterior surface only is available for reaction and the entering groups probably become concentrated at a few isolated spots. By the more uniform distribution of the ether groups the entire cellulose molecule is made to partake of the properties of cellulose ethers, whereby water-soluble cellulose derivatives are obtainable with the least possible modification of the cellulose.

In preparing these new cellulose ethers α-cellulose is dissolved in an aqueous solution of a quaternary ammonium hydroxide preferably trimethyl benzyl ammonium hydroxide and treated with a suitable methylating or ethylating agent such as methyl chloride, dimethyl sulfate, ethyl chloride and diethyl sulfate, preferably without the application of heat. After the reaction is complete the mixture is diluted with water and the quaternary ammonium hydroxide neutralized. The ether can be precipitated by adding a water miscible non-solvent such as ethyl alcohol, acetone, etc. or by heating the aqueous solution to 85° C. It can be freed of quaternary ammonium salts by washing with hot water.

The methyl and ethyl ethers of α-cellulose having from 0.6 to 1.0 methoxy or ethoxy group for each $C_6H_{10}O_5$ unit prepared by this method are water-soluble compounds that differ substantially from the known water-soluble methyl and ethyl cellulose ethers. They are more soluble in water and produce solutions of higher viscosity than the known ethers. Because of the low degree of alkylation and absence of cellulose degradation they possess more of the desirable properties of α-cellulose. They form films of high tensile strength that require no softening agent and because of the high viscosity of their aqueous solutions are excellent thickening agents, emulsifying agents, and dispersing agents. As thickening agents they are useful in textile printing pastes; in sizes or finishes for rayon, cotton or paper; in rubber latex compositions and in other aqueous emulsions and suspensions. As emulsifying and dispersing agents they are useful in preparing emulsions of resins, drying oils, edible oils and fats, and polymeric organic compounds such as polymerized acrylic, methacrylic and vinyl esters. They are valuable as sticking agents in insecticide sprays and dusts in which it is desirable to obtain cohesion to leaves and waxy surfaces. In insect sprays even when present in only minute quantities, they act as spreading agents and give a uniform distribution of spray particles over the surface being treated. This property also makes them very useful in water vehicle paints. Films made from the ethers can be used in making medicinal capsules and sausage casing. Their film forming properties also make them useful in permanent wave preparations. When applied to textiles or leather and subsequently calendered they impart a high luster to the surface. When incorporated in rubber they impart oil resistance and can be used in oil resistant linings in rubber hoses or containers. In many other ways their water-solubility, the high viscosity of the solutions, and the tough films that they form make them valuable industrial compounds.

In the following examples representative methods of preparation are given for purposes of illustration. By varying the concentrations and ratios of reactants ethers of lower or higher degree of alkylation can be obtained. Other modifications such as alkylation in stages and the preparation of mixed ethers while not illustrated will be apparent to those skilled in the art.

*Example 1.*—A solution of cellulose is prepared by mixing 150 grams of bleached sulfite wood pulp with one liter of a 35% solution of trimethylbenzyl ammonium hydroxide in a steel dough mixer. After mixing one hour, 150 grams of diethyl sulfate is slowly added, with constant agitation, over a period of one hour. The temperature rises slightly, but no external heat is applied. After stirring for two hours, 1500 cc. of water is added and mixed in to form a clear, viscous solution. The solution may be neutralized with acetic acid without precipitating any of the ethyl cellulose. The solution, as prepared, is a good thickening agent. It may be dried into tough films. By precipitating with alcohol, a dry, resinous solid is obtained.

Analysis of Zeisel Method (J. Chem. Soc. 81, 318 and 115,193): 0.2787 gram of material gave 0.2189 gram of AgI. Percent. $C_2H_5O$=15.05. This corresponds to 0.6 ethoxy groups to one $C_6H_{10}O_5$ unit.

*Example 2.*—A solution of cellulose is prepared by mixing 170 gr. of bleached sulfite cellulose with 700 cc. of a 40% solution of trimethylbenzyl ammonium hydroxide in a Werner-Pfleiderer type of mixer. After mixing one hour, 233 grams of diethyl sulfate is slowly added, with constant agitation, over a period of one hour. After mixing for five hours at room temperature, 2500 cc. of water is added slowly to form a clear, viscous solution. The solution is brought to neutrality with acetic acid, and heated to 85° C., whereupon the ethyl cellulose separates in curds, which are washed with hot water. On cooling, these particles of ethyl cellulose redissolve to form a clear, viscous solution. The dry material analyzed as follows: 0.3082 gram of material gave 0.3545 gram of AgI. Percent. $C_2H_5O$=22.0. This corresponds to 0.91 ethoxy groups to one $C_6H_{10}O_5$ unit.

*Example 3.*—A solution of cellulose prepared as in Example 1, is diluted with 130 cc. of water and 194 grams of diethyl sulfate is slowly added, with constant agitation, over a period of one hour. The material is then mixed at room temperature for six hours. It may be precipitated and washed as described in Example 1. Analysis: 0.2969 gram of material gave 0.3116 gram of AgI. Percent. $C_2H_5O$=20.1. This corresponds to 0.82 ethoxy groups to one $C_6H_{10}O_5$ unit.

*Example 4.*—A solution of cellulose is prepared by mixing 150 grams of bleached sulfite wood pulp with 600 grams of a 35% solution of trimethylbenzylammonium hydroxide in a steel dough mixer equipped with a steam jacket. After mixing for one hour at room temperature, the roughy mass is warmed to 55° C. by running steam into the outer jacket of the mixer and 1750 cc. of 4% aqueous sodium hydroxide is slowly added. The resulting solution is a syrupy liquid.

To 450 grams of cellulose solution prepared as above, is added slowly with constant agitation, 30 grams of dimethyl sulfate. Some heat is evolved by the reaction and the mass is allowed to warm up to 40° C. but no external heat is applied. After about two hours, the temperature falls to room temperature and stirring is continued for 18 hours. The reaction mass is poured into an equal volume of water in which it is almost completely soluble. The methyl cellulose may be isolated by neutralizing with acetic acid and adding one to two volumes of ethyl alcohol. The gelatinous precipitate is filtered and washed with alcohol. When dry it is a resinous solid soluble in water, but only slightly soluble in alcohol or acetone and insoluble in benzene or chloroform. In water it forms a viscous solution and may be used as a thickening agent. Analysis by Zeisel Method (J. Chem. Soc. 81, 318 and 115, 193): 0.2787 gram of material gave 0.2860 gram of AgI. Percent. $CH_3O$=13.55. This corresponds to 0.72 methoxy groups to one $C_6H_{10}O_5$ unit.

We claim:

1. A water soluble ether of $\alpha$-cellulose and an aliphatic monohydric alcohol containing less than 3 carbon atoms in which there are from 0.6 to 1.0 alkoxy groups to each $C_6H_{10}O_5$ unit.

2. A water soluble ethyl ether of $\alpha$-cellulose in which there are from 0.6 to 1.0 ethoxy groups to each $C_6H_{10}O_5$ unit.

3. A water soluble methyl ether of $\alpha$-cellulose in which there are from 0.6 to 1.0 methoxy groups to each $C_6H_{10}O_5$ unit.

DONALD H. POWERS.
LOUIS H. BOCK.
ALVA L. HOUK.